United States Patent [19]

McGee

[11] 4,083,613
[45] Apr. 11, 1978

[54] RETAINER FOR RESILIENTLY LOADING A BEARING

[75] Inventor: Mary Ann Chute McGee, Chillicothe, Ill.

[73] Assignee: Caterpillar Tractor Co., Peoria, Ill.

[21] Appl. No.: 767,858

[22] Filed: Feb. 11, 1977

[51] Int. Cl.² .................. F16C 33/30; F16D 1/06
[52] U.S. Cl. .................. 308/236; 29/148.4 C; 308/207 R; 308/DIG. 11; 403/261; 403/344
[58] Field of Search .......... 29/148.4 C; 308/165, 308/175, 189 R, 2.7 R, 214, 236, DIG. 11; 403/261, 344

[56] References Cited

U.S. PATENT DOCUMENTS

| | | | |
|---|---|---|---|
| 2,839,007 | 6/1958 | Benedek | 308/207 R X |
| 3,080,199 | 3/1963 | Rickley | 308/207 R |
| 3,196,727 | 7/1965 | Pray | 308/207 R X |
| 4,019,824 | 4/1977 | Percy | 403/261 |

*Primary Examiner*—Stephen G. Kunin
*Attorney, Agent, or Firm*—Wegner, Stellman, McCord, Wiles & Wood

[57] ABSTRACT

A retainer for resiliently applying a preload force to a bearing assembly rotatably supporting a shaft has a bore through which the shaft extends and is assembled from a plurality of separable sections. Formed in the wall of the bore are circumferential grooves which define lands therebetween. Similarly, circumferential grooves are formed about the shaft adjacent the end of the bearing assembly. One series of grooves are oblique to the shaft axis so that the respective lands are deflectively engaged when the retainer is radially closed about the shaft. The retainer is advantageously employed to maintain preloads on tapered roller bearings supporting the final drive shafts in heavy earthmoving equipment.

9 Claims, 5 Drawing Figures

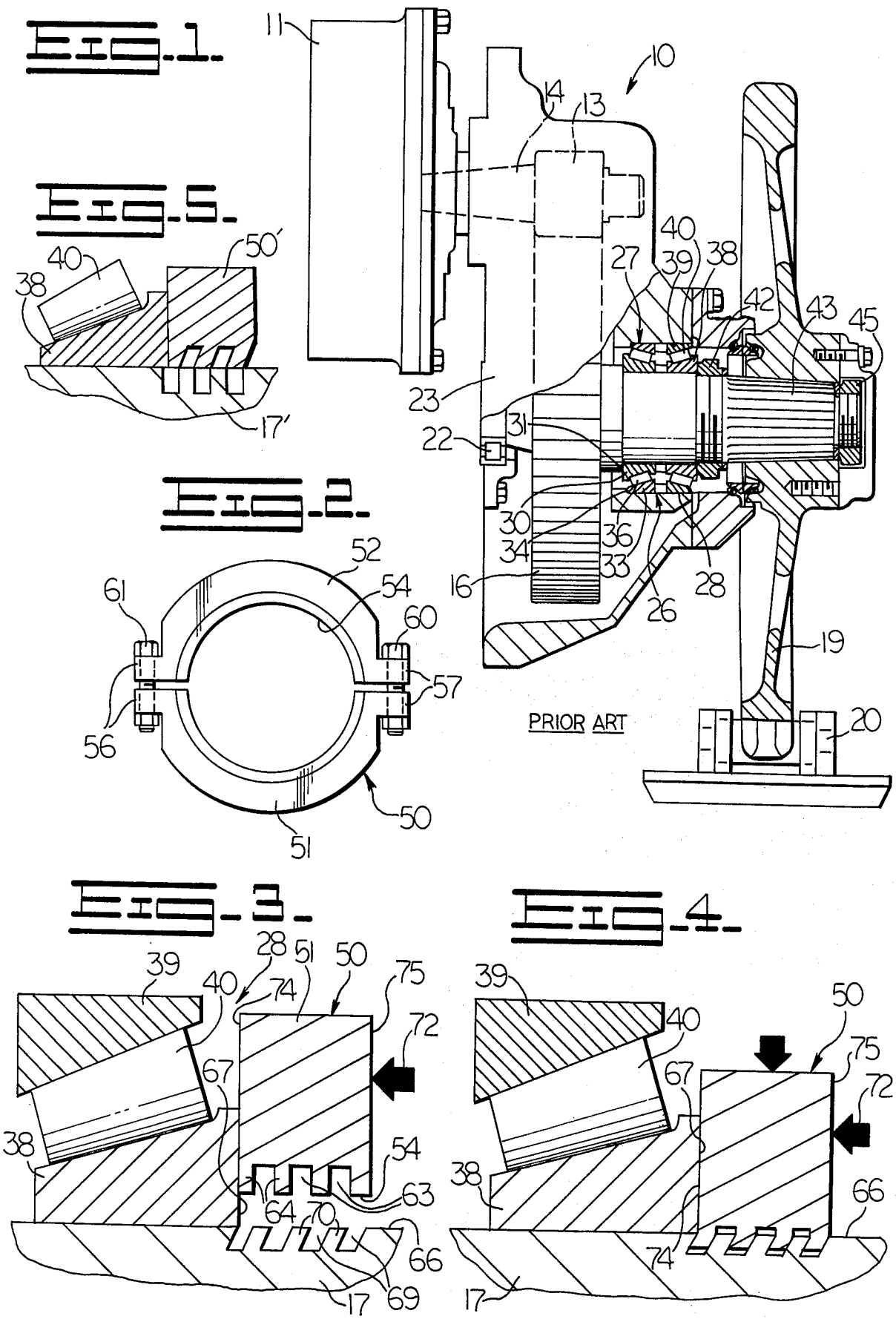

RETAINER FOR RESILIENTLY LOADING A BEARING

BACKGROUND OF THE INVENTION

This invention relates generally to a retainer providing preload force for a bearing supporting a rotatable shaft and, more particularly, to a clamping ring providing a resilient preload so as to maintain an axial compressive rebound force on the bearing.

While this invention may be employed in many fields, it is particularly useful in conjunction with drive assemblies for heavy-duty earthmoving equipment, such as crawler tractors and the like. The final drive and the traction chains spaced on each side of the crawler tractor are subjected to substantial radial and axial thrust loads. These loads are the result of the high driving force required for operation and the erratic loading placed on the tractor drive because of rough terrain, side hill operation and directional changes.

In order to provide sufficient friction free support for the highly-loaded rotatable drive shafts, shock resistant, heavy-duty, tapered roller bearings are employed. If properly arranged and preloaded, these tapered roller bearings have inherent capability to efficiently accommodate both radial and axial thrust loads. In order to withstand high stress loads and deflection of components, it is vital that the required preloads on the tapered roller bearings be maintained so as to provide rigidity, positive support and extended service life for the bearings and the associated components.

In the prior art, it is a common practice to place a lock nut onto the rotating shaft to bear against the bearing and maintain prescribed bearing preloads. However, a conventional lock nut has a tendency to work loose during operation so that the bearing preload is diminished. In general, rotation of the lock nut ten degrees will alter the breakaway torque of the lock nut by approximately 100 foot-pounds.

It is possible to make periodic inspections and service adjustments of the bearing and lock nut. In some applications, ready accessibility makes these inspections and adjustments expedient. Even when the bearings and the lock nuts are not readily accessible, prudent inspections and periodic service should not be ignored. In the case of crawler-type tractors where the track chains and the drive sprockets must be removed, such periodic inspections are conducted at great expense. However, if service adjustments to the bearings and lock nuts are not made, serious damage and total failure of major components can result before operators or service personnel even become aware of the problem.

In order to eliminate the need for periodic servicing, numerous means have been devised to maintain the lock nut in fixed position on the shaft so that the bearing will be subjected to a constant preload force. Lock nuts have been employed which include integral synthetic plastic rings and/or plastic washers for securely gripping the coacting threads on the shaft. However, shaft deflection under high loads may cause this type of lock nut to loosen thereby resulting in partial or complete loss of vital bearing preloads.

A lockwasher which is fixedly secured to the lock nut is available, but is relatively expensive. The lockwasher has internal serrations to prevent rotation of the lockwasher on the shaft and tangs to engage the specially-designed lock nut. A key has been utilized between keyways formed in the lock nut and in the shaft to prevent relative rotation of the lock nut. A threaded split nut has been utilized. The use of shims in conjunction with a plate fixed to the shaft has also been employed to provide correct positioning of the bearing.

The above methods for obtaining and retaining a preload on the bearing securely fix the bearing against axial movement in one direction relative to the shaft. However, it has been found that it is desirable that the retainer or lock nut providing the preload force for the bearing have a degree of resiliency capable of maintaining an axial compressive rebound force even when it is loosened slightly. This compressive rebound force maintains a preload on the bearing races which is capable of assuring continued operating efficiency. Conventional lock nuts are not usually capable of providing this axial compressive rebound force.

SUMMARY OF THE INVENTION

The present invention is directed to overcoming one or more of the problems as set forth above.

According to the present invention, a bearing disposed about and rotatably supporting a shaft is held in preloaded position by a retainer having an axial bore with a wall in which circumferential grooves are formed so as to define alternating axially-spaced grooves and lands. The shaft, in turn, has a circumferential surface with spaced grooves formed therein so as to define alternating axially-spaced grooves and lands adjacent the desired preloaded position of the bearing. The retainer is moved radially into engagement with the shaft so that the respective coacting grooves and lands mesh, thereby securing the retainer to the shaft and resiliently securing the bearing against substantial axial movement.

One or both of the retainer and the shaft has sloped grooves and lands which are oblique to the shaft axis. Elastic deflection and deformation of the lands is effected by tightening the retainer on the shaft. The utilization of coacting distortable or deflectable sloped and annular ribs and lands provides a degree of resiliency capable of maintaining an axial compressive rebound force. An interference fit of the interleaved lands and grooves of the clamping ring and the shaft eliminates the need for close matching of the components.

In an exemplary embodiment of the invention, the clamping ring is formed from a plurality of separable sections. Means are provided for securing the sections together and for moving the sections radially inward so as to constrict the opening through the clamping ring and tighten the clamping ring on the shaft. Because of the radial shifting capability of the clamping ring sections, simple hand or pneumatic-actuated power wrenches can be utilized to secure the clamping ring on the shaft while press means axially applies the bearing preload.

BRIEF DESCRIPTION OF THE DRAWINGS

FIG. 1 is an elevational view of a crawler tractor final drive partially in section in which a prior art self-locking retainer nut is employed to axially fix the inner race of a tapered roller bearing on a shaft;

FIG. 2 is a plan view of a retainer ring constructed in accordance with the invention which is operative to axially fix the inner race of the tapered roller bearing;

FIG. 3 is a fragmentary enlarged cross-sectional view of a bearing with the clamping ring in an unloaded position prior to the engagement of the sloping grooves and lands of the drive shaft;

FIG. 4 is a fragmentary enlarged cross-sectional view similar to FIG. 3 with the clamping ring securely engaged with the sloping grooves and the lands of the drive shaft; and FIG. 5 is a fragmentary enlarged cross-sectional view of an alternative embodiment of the invention in which the slope of the corresponding lands and grooves has been reversed.

DESCRIPTION OF THE PREFERRED EMBODIMENTS

In FIG. 1, a final drive assembly for a crawler tractor, generally designated 10, is seen to broadly include a steering clutch 11, a pinion gear 13 fixed on a shaft 14, a gear 16 which meshes and is rotated by the pinion gear 13, a sprocket drive shaft generally designated 17, fixed to the gear 16 and rotated thereby, a sprocket wheel 19 fixed to the drive shaft 17, and a complementing traction chain 20 driven continuously by the sprocket wheel 19. The tractor engine (not shown) provides power to the steering clutch 11 for operating the sprocket wheel 19.

The sprocket drive shaft 17 is journaled on one side of the gear 16 by suitable bearings 22 carried by the final drive housing 23. On the opposite side of the gear 16, the drive shaft 17 is supported by a tapered roller bearing assembly, generally designated 26, carried by the drive housing 23. The bearing assembly 26 has high radial and axial thrust load capability. The bearing assembly 26 includes an inner bearing 27 and an opposed outer bearing 28. The inner bearing 27 has an inner cone race 30 seated against an internal shoulder 31 formed in the drive shaft 17, an outer cup race 33 seated against a shoulder 34 of the drive housing 23, and tapered rollers 36 which are held in operative position between the cone race 30 and the cup race 33. Similarly, the outer bearing 28 has an inner cone race 38, an outer cup race 39, and tapered rollers 40.

In the prior art, a lock nut 42 was threaded onto the drive shaft 17 as seen in FIG. 1 so as to bear against the outboard end of the cone race 38 in order to provide the required preload on the bearing assembly so as to obtain positive support for the drive shaft 17. The sprocket wheel 19 is positioned outboard of the lock nut 42 and is fixed to the drive shaft 17 against rotation relative thereto via axially-extending splines 43. The sprocket wheel 19 is fixed against outward axial movement by a lock nut 45 which is threaded onto the outer end of the drive shaft 17 and bears against the sprocket wheel 19.

FIG. 2 illustrates a clamping ring or retainer, generally designated 50, which, in accordance with the invention, is employed in lieu of the lock nut 42 shown in the prior art structure of FIG. 1. With the exception of this substitution for the lock nut 42, a final drive assembly incorporating the invention is constructed in the manner as illustrated in FIG. 1. The clamping ring 50 is seen to include a pair of semicircular ring sections 51 and 52 which define an internal bore 54 when assembled. Each of the ring sections 51 and 52 includes radially-extending portions 56 and 57 through which bolts 60 and 61, respectively, extend to secure the ring sections 51 and 52 together.

As best seen in FIG. 3, a series of axially-spaced circumferential annular grooves 63 are formed in the wall of the bore 54 so as to define a surface having alternately axially-spaced grooves 63 and ribs or lands 64. The grooves 63 and therefore the lands 64 have a rectangular cross section and a prescribed radial depth.

Formed in the circumferential surface 66 of the drive shaft 17 adjacent the desired position of the outer end 67 of the cone race 38 is a series of axially-spaced grooves 69 which, in turn, define a series of axially-spaced ribs or lands 70. The grooves 69 and therefore the lands 70 have a parallelogram cross-section, the grooves 69 sloping radially inward and axially inward from the circumferential surface 66 so that they are disposed oblique to the shaft axis.

In FIG. 3, one section of the clamping ring 50 is being installed and is loaded by suitable press means indicated by arrow 72. The press means 72 forcefully urges the clamping ring 50 and therefore the cone race 38 inwardly to the desired preloaded position. When the clamping ring 50 is sufficiently loose on the drive shaft 17, the press means 72 can readily shift the outer bearing 28 and the clamping ring 50 axially inward without interference. When the loosely-coupled clamping ring 50 is properly positioned with the grooves 63 and the lands 64 of the clamping ring 50 being aligned with the respective lands 70 and grooves 69 of the drive shaft 17, the bolts 60 and 61 are tightened with sufficient torque to move the ring sections 51 and 52 together to effect engagement of the respective grooves and lands of the drive shaft 17 and the clamping ring 50. The inner surface 74 and the outer surface 75 of the clamping ring 50 are smooth to permit the clamping ring 50 to move radially inward towards the drive shaft 17 with relative ease regardless of the press force being employed.

As shown by FIG. 4, predetermined tightening of bolts 60 and 61 effects elastic deflection of the straight lands by the angled or sloping grooves 69 and lands 70 of shaft 17. Regardless of how many straight and sloped lands and grooves are employed to obtain the reaction loading force, the coacting relatively shallow grooves and lands must be of sufficient depth to result in a prescribed level of axial deflection of the straight lands 64. With sufficient elasticity and rebound, the displaced lands 64 will maintain a relatively high level of compressive force to keep the bearing assembly 26 properly preloaded. Disengagement of the coacting lands and grooves is unlikely because the bolts 60 and 61 are tightened with substantial torque and the deflected lands 64 of the clamping rings 50 are in shear radially and therefore tend to retard direct tensile loading and yielding of bolts 60 and 61.

The deflection required from the sloping and elastically displaced angular lands 64 need only be sufficient to compensate for any limited fatigue or yielding of the bolts 60 and 61 and any inherent tendency for the elastically displaced lands 64 to take some limited permanent set. Even with some yielding of the bolts 60 and 61 and some permanent setting occurring in the lands 64, sufficient rebound capability in the material will afford continuance of desired preloads on the tapered roller bearing assembly 26.

FIG. 5 illustrates how the angular or sloped and straight lands and grooves can be reversed in the coacting shaft 17' and clamping ring 50' while the elastic deflection are rebound force for maintenance of bearing preloads remains the same.

Elastic deflection of the angular and straight lands by tightening of bolts 60 and 61 will generate a rebound force ranging from 7,000 to 10,000 pounds axial preload on one or dual coacting tapered roller bearings. Preferably, the clamping ring 50 is made of softer material than the supporting shaft 17, and can even be made of material other than metal. Either the entire ring or just the lands can be made of metal or other synthetic man-made materials as long as a deformable material with elastic rebound capabilities is used. The interference fit of the interleaved lands and grooves of the clamping ring and reacting surface requires no close machining. Because of radial shifting capability of the ring sections, present simple hand- or pneumatic-actuated power wrenches can be utilized to secure the clamping rings under the bearing preload.

The embodiments of the invention in which an exclusive property of privilege is claimed are defined as follows:

1. A mounting assembly for a shaft including a bearing assembly positioned circumferentially about the shaft for rotatably supporting the shaft within a housing, means carried by the housing and the shaft for restraining axial movement of the bearing assembly inward along the shaft, and retaining means adjacent the outward end of the bearing assembly for preventing substantial axial movement of the bearing assembly outward along the shaft, said retaining means comprising:

a retainer having a central bore through which the shaft extends, said bore having a plurality of axially-spaced grooves disposed circumferentially thereabout, adjacent grooves defining a land therebetween; and means for maintaining said retainer radially inward against the circumference of the shaft, the shaft having a plurality of axially-spaced grooves circumscribed thereabout adjacent the outward end of the bearing assembly, adjacent grooves defining a land therebetween, said grooves of at least one of said retainer and shaft being oblique to the shaft axis, whereby said retainer may be closed about the shaft so that said lands of one of said retainer and shaft are deflectively positioned in corresponding grooves of the other of said retainer and shaft so as to secure said retainer to the shaft thereby resiliently fixing the bearing assembly against substantial axial movement outward along the shaft.

2. The retainer of claim 1 wherein said grooves on the circumference of said retainer bore have rectangular cross sections and are annularly disposed, and said grooves on the circumference of the shaft have parallelogram cross sections and extend radially inward and axially inward.

3. The retainer of claim 1 wherein said grooves on the circumference of the shaft have rectangular cross sections and are annularly disposed, and said grooves on the circumference of said retainer have parallelogram cross sections and extend radially outward and axially outward.

4. A mounting assembly for a shaft including a bearing assembly positioned circumferentially about the shaft for rotatably supporting the shaft within a housing, means carried by the housing and the shaft for restraining axial movement of the bearing assembly inward along the shaft, and retaining means adjacent the outward end of the bearing assembly for preventing substantial axial movement of the bearing assembly outward along the shaft, said retaining means comprising:

a retainer defined by a plurality of separable sections and having a central bore through which the shaft extends, said bore having a plurality of axially-spaced grooves disposed circumferentially thereabout, adjacent grooves defining a land therebetween; and means for joining adjacent sections together to maintain said retainer radially inward against the circumference of the shaft, the shaft having a plurality of axially-spaced grooves circumscribed thereabout adjacent the outward end of the bearing assembly, adjacent grooves defining a land therebetween, said grooves of at least one of said retainer and shaft being oblique to the shaft axis, whereby said retainer may be closed about the shaft so that said lands of one of said retainer and shaft are deflectively positioned in corresponding grooves of the other of said retainer and shaft so as to secure said retainer to the shaft thereby resiliently fixing the bearing assembly against substantial axial movement outward along the shaft.

5. The shaft mounting assembly of claim 4 wherein said retainer sections have a radially-extending flange at each end, and said joining means includes bolts extending between adjacent flanges of adjoining retainer sections, said bolts being tightened to draw said sections together radially inward against the shaft and effect engagement of the respective grooves and lands.

6. The shaft mounting assembly of claim 4 wherein said bearing assembly includes a bearing comprised of an outer cup race, an inner cone race and tapered rollers acting therebetween, said inner cone race being positioned on the shaft and having an outward edge against which said retainer bears.

7. The shaft mounting assembly of claim 6 wherein said bearing assembly further includes a second bearing comprised of a second outer cup race, a second inner cone race and tapered rollers acting therebetween, said second bearing being oriented oppositely of and positioned inward of said first-named bearing, said second cone race having an inward end abutting a shoulder carried by the shaft, said second cup race having an inward end abutting a shoulder carried by the housing, said retainer retaining the inward end of said second cup race against the housing shoulder to load said bearing assembly.

8. In combination with a crawler tractor final drive assembly including a shaft having an outer portion with axially-extending splines and an inner portion, a bearing assembly rotatably supporting the shaft positioned about said inner portion, and a sprocket mounted outboard of the bearing assembly on said outer portion, retaining means for preventing substantial axial movement of the bearing assembly outward along the shaft comprising:

a retainer having a central bore through which the shaft extends, said bore having a plurality of axially-spaced grooves disposed circumferentially thereabout, adjacent grooves defining a land therebetween; and means for maintaining said retainer radially inward against the circumference of the shaft, the shaft having a plurality of axially-spaced grooves circumscribed about the shaft outwardly adjacent the bearing assembly and inwardly of the sprocket, adjacent grooves defining a land therebetween, said grooves of at least one of said retainer and shaft being oblique to the shaft axis, whereby said retainer may be closed about the shaft so that said lands of one of said retainer and shaft are deflectively positioned in corresponding grooves of the other of said retainer and shaft so as to secure said retainer to the shaft thereby resiliently fixing said bearing assembly against substantial axial movement outwardly along said shaft.

9. A retainer for resiliently loading a bearing mounting a rotatable shaft, comprising:

a separable clamping ring having an inner surface to fit about the shaft, said surface containing resiliently deformable lands generally circumferentially of said shaft, a shaft section adjacent the bearing and having grooves to receive said lands, one of said lands and receiving grooves being oblique to the shaft axis, and fastening means for clamping the ring onto the shaft to mesh the lands and grooves forcing the retainer axially against the bearing.

* * * * *